Figure 1:
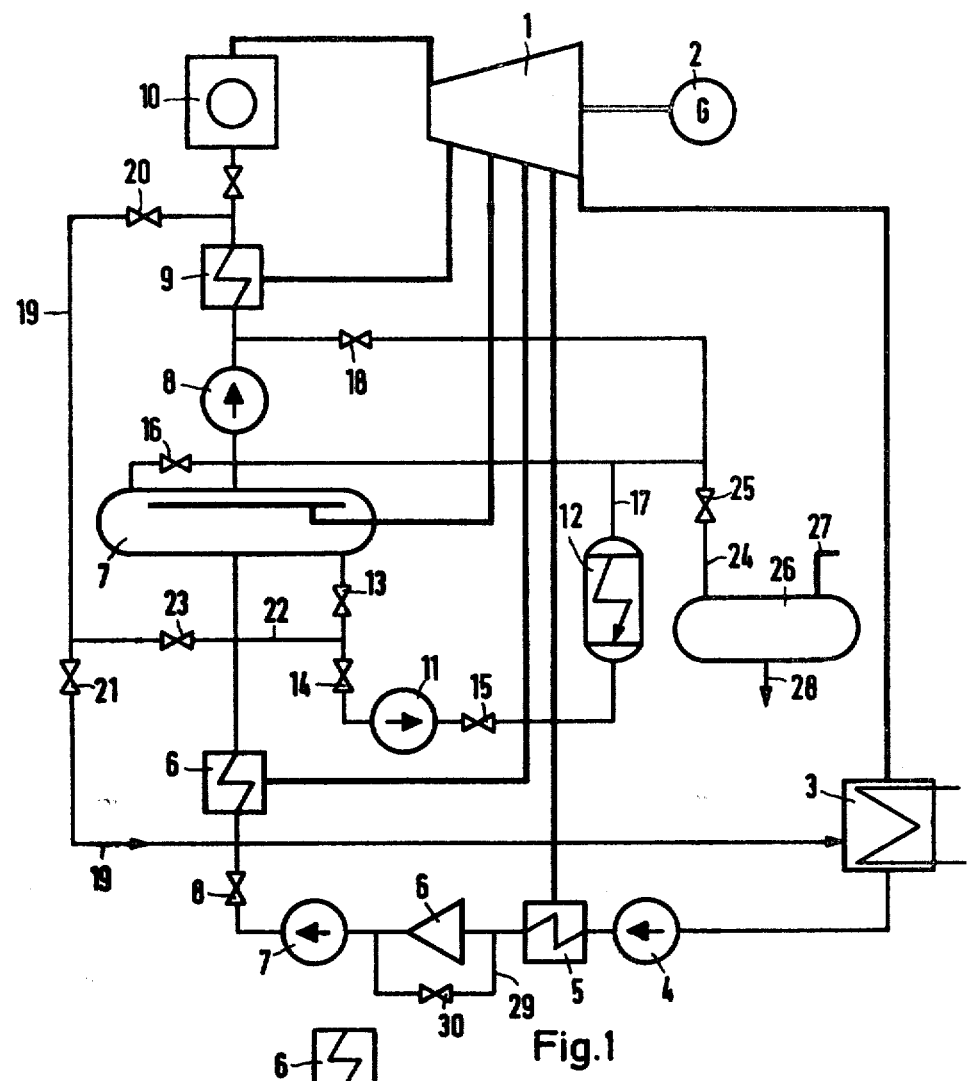

United States Patent [19]

Heitmann et al.

[11] 3,894,391
[45] July 15, 1975

[54] FEEDWATER PURIFICATION SYSTEM FOR A STEAM POWER PLANT WITH BOILING-WATER REACTOR

[75] Inventors: Hans Gunter Heitmann, Erlangen-Buckenhof; Ruprecht Knorlein, Erlangen, both of Germany

[73] Assignee: Siemens Aktiengesellschaft, Munich, Germany

[22] Filed: Aug. 21, 1973

[21] Appl. No.: 390,229

[30] Foreign Application Priority Data
Aug. 22, 1972  Germany.......................... 2241237

[52] U.S. Cl. ............................................... 60/575
[51] Int. Cl. ............................................. F22d 7/00
[58] Field of Search ............................. 60/107, 657

[56] References Cited
UNITED STATES PATENTS

| | | | |
|---|---|---|---|
| 3,194,020 | 7/1965 | Hancalek | 60/107 X |
| 3,413,809 | 12/1968 | Bredtshneider | 60/107 X |
| 3,518,830 | 7/1970 | Viscovich | 60/107 X |

Primary Examiner—Irwin C. Cohen
Assistant Examiner—Allen M. Ostrager
Attorney, Agent, or Firm—Herbert L. Lerner

[57] ABSTRACT

Feedwater purification system for a steam power plant having a boiling-water reactor, includes a condenser and regenerative preheater means connected in the system, one of which being formed at least partly of ferritic material, a feedwater tank connected in the system with the condenser and the regenerative preheater means, the feedwater tank being of a construction so as to serve simultaneously as a mixing preheater, the regenerative preheater means includes low-pressure preheater means connected with the feedwater tank upstream thereof, and high-pressure preheater means connected with the feedwater tank downstream thereof, condensate purification equipment and electromagnetic filter means supplementary thereto connected therewith in the system downstream of the condenser in direction of feedwater flow therethrough, a circulation pump serially connected with the electromagnetic filter means, the series connection of the circulation pump and the electromagnetic filter means being, in turn, connected in parallel, by lines provided with valve means, to the feedwater tank, to the high-pressure preheater means and to a series connection of the high-pressure preheater means, the condenser, the low-pressure preheater means and the feedwater tank, and a closable bypass line connected in parallel with the condensate purification equipment.

4 Claims, 2 Drawing Figures

FEEDWATER PURIFICATION SYSTEM FOR A STEAM POWER PLANT WITH BOILING-WATER REACTOR

The invention relates to a feedwater purification device for a steam power plant with a boiling-water reactor.

Steam power plants with boiling-water nuclear reactors have stringent requirements as to the purification of the feedwater from the impurities contained therein. For continuous purification of the condensate being produced, condensate purification facilities are conventionally connected directly to the condenser downstream therefrom. In spite of this, large parts of the feedwater system must be formed of non-ferritic material in order to keep the level of corrosion products in the reactor feedwater as low as possible and to suppress iron oxide deposits at the fuel elements to a marked extent.

Electromagnetic filters, as a supplement to chemical purification of the condensate, are capable of keeping the feedwater of a steam power plant of this kind largely free of ferritic impurities. Without the additional introduction of an electromagnetic filter into the feedwater system, the purification of the feedwater after periods of shutdown of the installation is very time-consuming, because large quantities of feedwater have to be circulated for a long time in order to attain adequate purification of the feedwater. Furthermore, a higher level of corrosion products in the feedwater is to be expected during operation, if the feedwater tank is operated at the same time as a mixing preheater i.e. if part of the bleeder steam is fed directly into the feedwater tank. This heretofore known solution, which is very advantageous for the design of the low pressure part of the feedwater circulatory system, can be used only conditionally when a condensate purification facility is introduced into steam power plants with boiling-water reactors wherein ferritic materials are used extensively in the feedwater system.

It is accordingly an object of the invention of the instant application to provide a feedwater purification system for a steam power plant with an electromagnetic filter for the purification of the feedwater so that rapid and effective purification of the feedwater is assured after period of shutdown of the steam power plant as well as during operation without excessive strain on the chemical condensate purification equipment and without the danger that the use of ferritic materials in the feedwater tank, which serves as a mixing preheater, can lead to increased contamination.

With the foregoing and other objects in view, there is provided, in accordance with the invention, a feedwater purification system for a steam power plant having a boiling-water reactor, comprising a condenser and regenerative preheater means connected in the system, one of which being formed at least partly of ferritic material, a feedwater tank connected in the system with the condenser and the regenerative preheater means, the feedwater tank being of a construction so as to serve simultaneously as a mixing preheater, the regenerative preheater means comprising low-pressure preheater means connected with the feedwater tank upstream thereof, and high-pressure preheater means connected with the feedwater tank downstream thereof, condensate purification equipment and electromagnetic filter means supplementary thereto connected therewith in the system downstream of the condenser in direction of feedwater flow therethrough, a circulation pump serially connected with the electromagnetic filter means, the series connection of the circulation pump and the electromagnetic filter means being, in turn, connected in parallel, by lines provided with valve means, to the feedwater tank, to the high-pressure preheater means and to a series connection of the high-pressure preheater means, the condenser, the low-pressure preheater means and the feedwater tank, and a closable bypass line connected in parallel with the condensate purification equipment.

Other features which are considered as characteristic for the invention are set forth in the appended claims.

Although the invention is illustrated and described herein as a feedwater purification system for a steam power plant with a boiling-water reactor, it is nevertheless not intended to be limited to the details shown, since various modifications may be made therein without departing from the spirit of the invention and within the scope and range of equivalents of the claims.

Figure 2:
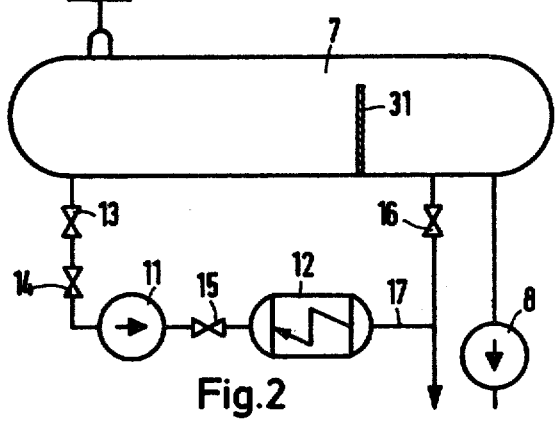

The invention, however, together with additional objects and advantages thereof will be best understood from the following description when read in connection with the accompanying drawing, in which:

FIG. 1 is a block diagram of a feedwater purification system according to the invention of the instant application; and FIG. 2 is an enlarged fragmentary view of FIG. 1 showing in greater detail the feedwater tank with inlets to and outlets from the electromagnetic filter and to the rest of the feedwater circulatory system.

Referring now to the drawing and first, particularly, to FIG. 1 thereof, there can be seen that from the low-pressure part of a turbine 1, which drives a generator 2, steam travels to a condenser 3, where it is condensed and, as condensate, reaches a feedwater tank 7 through a condensate pump 4, a low-pressure preheater 5, the condensate purification equipment 36, a main condensate pump 37, a valve 8 and additional low-pressure preheaters 6. From the feedwater tank 7, the feedwater is pumped by a feedwater pump 38 through a high-pressure preheaters 9 into a boiling-water nuclear reactor 10, where it evaporates and from which it is fed to the turbine 1. The low-pressure preheaters 5 and 6 and the high-pressure preheaters 9 are connected on the steam side, together with the feedwater tank 7, to taps of the turbine 1. The low-pressure and high-pressure preheaters, the feedwater tank 7, as well as the connecting pipelines have steam jackets that are formed of ferritic materials.

A serially connected circulation pump 11 and electromagnetic filter 12 are, in turn, connected through valves 13 to 16 in parallel with the feedwater tank 7. The electromagnetic filter 12 has an outlet line 17 that is also connected to the inlet of the high-pressure preheater 9 through a valve 18. Another feedwater line 19, in which the valves 20 and 21 are connected, branches from the outlet of the high-pressure preheater 9. The feedwater line 19 terminates in the condenser 3. A connecting line 22, in which a valve 23 is connected, is disposed between a junction point of valves 20 and 21 in the feedwater line 19 and a junction point of the valves 13 and 14, which are located between the circulation pump 11 and the feedwater tank 7. From the outlet line 17 of the electromagnetic filter 12, there branches off a rinsing or flushing line 24, in which a valve 25 is connected. The flushing line 24 terminates in a decompression tank 26, which has an exhaust steam line 27 that terminates in the condenser 3 and an outlet line 28 for the water that condenses therein which leads to a non-illustrated nuclear waste water processing facility. A bypass line 29 with a valve 30 connected therein is additionally provided in parallel with the condensate purification equipment 36.

FIG. 2 illustrates in enlarged view and with greater detail an advantageous embodiment of the feedwater tank 7. It is clearly apparent that the line coming from the low-pressure preheater 6 connects with the feedwater tank 7 at the left-hand side thereof as viewed in FIG. 2, and that the line to the electromagnetic filter 12 also branches off from the left-hand side of the feedwater tank 7 through the valves 13 and 14 to the circulation pump 11, while the outlet line 17 of the electromagnetic filter 12 returns to and connects with the feedwater tank 7 through the valve 16 in the vicinity of the right-hand side thereof as viewed in FIG. 2. The supply line leading to the feedwater pump 8 is also located at the right-hand side of the feedwater tank 7 in FIG. 2, so that, with the construction of the electromagnetic filter 12 for full reactor feedwater capacity, the quantity of feedwater passing through the feedwater tank 7 is conducted through the electromagnetic filter 12. A partition 31 in the feedwater tank 7 can largely prevent the feedwater in the right-hand and left-hand part of the tank 7, as viewed in FIG. 2, from mixing. The partition 31 is formed with feedwater flow-through openings, so that the feedwater supply of the reactor is maintained even when there is a failure of the filter system. After periods of shutdown of the steam power plant, the water contained in the feedwater system has a higher level of corrosion products. Consequently, before starting-up the plant, this water is heated up with external steam and the water content of the feedwater tank 7 is initially purified with the valves 13, 14, 15 and 16 open and the circulation pump 11 switched on. When the contamination of this water can be reduced no further, the valve 16 is closed, and the valves 18, 20 and 23 are opened. The result thereof is that the water in the high-pressure preheaters 9 is purified separately. After these two portions of the content of the feedwater circulation system are purified, the valve 23 is closed and the valve 21 is opened, so that, as viewed downstream in the direction of feedwater flow from the circulation pump 11, the electromagnetic filter 12 is connected in series with the high-pressure preheaters 9, the condenser 3, the low-pressure preheaters 5 and 6 and the feedwater tank 7. In this phase of the purification process, the valve 30 is opened so that no water flows through the condensate purification equipment 36. The formation of a series connection of the major portion of the feedwater circulatory system only after the water in the feedwater tank 7 and in the high-pressure preheaters 9 has been purified, affords the great advantage that only purified water flows into the condenser 3, so that, in spite of a relatively long dwell time, no corrosion products deposit in the condenser 3, a result that could otherwise be attained only by connecting the electromagnetic filter 12 directly ahead or upstream of the condenser 3.

When the impurities can be reduced no further with this mode of operation, the valve 30 is closed and the pre-purification of the system, inclusive of the condensate purification equipment 6, is continued until the reactor 10 can be placed in operation. During operation, only the valves 13, 14, 15 and 16 are opened, so that, depending upon the construction of the electromagnetic filter 12, part or all of the feedwater flow passing through the feedwater tank 7 is purified in the electromagnetic filter 12.

A particularly advantageous possibility of rinsing or flushing the system is afforded if a decompression tank 26 is connected to the flushing line 24, and the feedwater of the steam power plant is used for flushing the electromagnetic filter 12. Behind or downstream of the valve 25, the flushing water is decompressed, so that part of this water evaporates and can be passed directly to the condenser 3 through an exhaust steam line 27 while, through an output line 28 of the decompression tank or water separator 26, relatively little water having a very high degree of contamination is fed to a non-illustrated conventional nuclear waste water processing facility.

We claim:
1. Feedwater purification system for a steam power plant having a boiling-water reactor, comprising a condenser and regenerative preheater means connected in the system, one of which being formed at least partly of ferritic material, a feedwater tank connected in the system with said condenser and said regenerative preheater means, said feedwater tank being of a construction so as to serve simultaneously as a mixing preheater, said regenerative preheater means comprising low-pressure preheater means connected with said feedwater tank upstream thereof, and high-pressure preheater means connected with said feedwater tank downstream thereof, condensate purification equipment and electromagnetic filter means supplementary thereto connected therewith in the system downstream of said condenser in direction of feedwater flow therethrough, a circulation pump serially connected with said electromagnetic filter means the series connection of said circulation pump and said electromagnetic filter means being, in turn, connected in parallel, by lines provided with valve means, to said feedwater tank, to said high-pressure preheater means and to a series connection of said high-pressure preheater means, said condenser, said low-pressure preheater means and said feedwater tank, and a closable bypass line connected in parallel with said condensate purification equipment.

2. Feedwater purification system according to claim 1 wherein said electromagnetic filter means has an outlet line having a pair of valves connected therein, said outlet line communicating through one of said pair of valves with said feedwater tank and through the other of said pair of valves with an inlet line to said high-pressure preheater means.

3. Feedwater purification system according to claim 1 including a water separator, and a flushing line connected to said water separator, said electromagnetic filter means having an outlet line communicating with said water separator through said flushing line.

4. Feedwater purification system according to claim 1 including a feedwater pump, and wherein said feedwater tank has two regions, said low-pressure preheater means and said circulation pump having lines extending therefrom and connected to said feedwater tank in one of said regions thereof, said electromagnetic filter means and said feedwater pump having a respective outlet line and inlet line both terminating in said feedwater tank in said other of said regions thereof.

* * * * *